(12) United States Patent
Nygaard

(10) Patent No.: US 12,106,677 B1
(45) Date of Patent: Oct. 1, 2024

(54) INTERACTIVE PLAY ARCH AND LEARNING SYSTEM

(71) Applicant: George Nygaard, Naples, FL (US)

(72) Inventor: George Nygaard, Naples, FL (US)

( * ) Notice: Subject to any disclaimer, the term of this patent is extended or adjusted under 35 U.S.C. 154(b) by 276 days.

(21) Appl. No.: 17/588,417

(22) Filed: Jan. 31, 2022

(51) Int. Cl.
*G09B 19/22* (2006.01)
*A63H 5/00* (2006.01)

(52) U.S. Cl.
CPC ............. *G09B 19/22* (2013.01); *A63H 5/00* (2013.01); *A63H 2200/00* (2013.01)

(58) Field of Classification Search
CPC ... G09B 1/02; G09B 1/04; G09B 1/06; G09B 1/16; G09B 5/02; G09B 5/04; G09B 5/06; G09B 5/062; G09B 5/065; G09B 7/06; G09B 7/066; G09B 19/22; G09B 19/0023
USPC .................. 434/167, 169, 170; 446/227, 404
See application file for complete search history.

(56) References Cited

U.S. PATENT DOCUMENTS

| | | | |
|---|---|---|---|
| 4,627,588 A | 12/1986 | Block | |
| 5,076,520 A | 12/1991 | Bro | |
| 5,478,268 A * | 12/1995 | Au | A63H 33/006 446/397 |
| 6,332,824 B2 * | 12/2001 | Tell | A63H 33/006 446/143 |
| 6,702,643 B1 * | 3/2004 | Drosendahl | A63H 33/006 446/175 |
| 7,470,167 B2 * | 12/2008 | Clark | G08B 21/0208 446/175 |
| 7,490,379 B2 * | 2/2009 | Solomon | A47D 15/003 5/655 |
| 8,430,711 B2 * | 4/2013 | Chininis | A63H 33/006 446/236 |
| 8,795,023 B2 * | 8/2014 | Elson | A63H 33/006 446/227 |
| 9,155,974 B2 | 10/2015 | Fair et al. | |
| 9,415,323 B2 | 8/2016 | Austern et al. | |
| 9,757,660 B2 | 9/2017 | Leibovics | |
| 9,821,240 B2 * | 11/2017 | Hansen | A63H 33/006 |
| D818,543 S | 5/2018 | Zanger et al. | |
| 10,105,617 B2 * | 10/2018 | Monge Nunez | A63H 33/006 |
| 10,307,686 B2 * | 6/2019 | Bearsch | G03B 29/00 |
| 2014/0045158 A1 * | 2/2014 | Movsas | G09B 5/06 434/236 |
| 2016/0067623 A1 * | 3/2016 | Hansen | A63H 33/22 446/227 |

* cited by examiner

*Primary Examiner* — Joseph B Baldori
(74) *Attorney, Agent, or Firm* — LOEFFLER IP GROUP, P.A.; Bryan L. Loeffler, Esq.

(57) ABSTRACT

An activity arch (1) and system for promoting cognitive development in infants and toddlers wherein a child is prompted to make selections based on a system of audio and/or visual ques that improve the child's knowledge and cognitive skills.

2 Claims, 3 Drawing Sheets

INTERACTIVE PLAY ARCH AND LEARNING SYSTEM

FIELD OF THE INVENTION

The present invention relates to toys for infants and toddlers, and more particularly, to an activity toy for promoting cognitive development in infants and toddlers.

BACKGROUND OF THE INVENTION

Infants and toddlers develop by observing and interacting with their surrounding environments. Consequently, toys for very young children are often developed to create sensory experiences by producing lights and sounds based on the random actuation of various buttons or switches by a child. While the illumination of randomly selected figures or shapes may entertain a child, it will not hold the child's attention or improve the child's cognitive ability beyond learning how to active a button or switch.

Therefore, a need exists for an activity toy for promoting cognitive development in infants and toddlers wherein a child is prompted to make selections based on a system of audio and/or visual ques that promote the child's knowledge and cognitive skills.

SUMMARY OF THE INVENTION

The primary object of the present invention is to provide a toy and system for promoting cognitive development in infants and toddlers wherein a child is prompted to make selections based on a system of audio and/or visual ques that improve the child's knowledge and cognitive skills.

The present invention fulfills the above and other objects by providing an activity arch for use in conjunction with a playmat wherein the activity arch is placed over a child laying on his or her back and or within reach of a toddler in a sitting or standing position. The activity arch provides a structure and housing for supporting at least one speaker and a plurality of actuators, all of which are connected to a processor programmed to deliver audio ques to a child through the at least one speaker. The audio ques prompt the child to select a specific actuator from the plurality of actuators located on the arch. Each actuator is preferably coupled with a unique visual representation each visual representation being taken from a set of possible answers available to the child in response to an auditory que.

For example, the actuators may be light-up buttons each having an assigned visual representation of specified color. A child may be prompted to select a specific color from the group of actuators. If the child selects a visual representation of the correct answer and corresponding actuator, then the processor will deliver an audio confirmation of a correct selection being made by the child. Alternatively, if the child selects the wrong visual representation and actuator, then the processor will deliver an audio confirmation of an incorrect selection being made by the child.

Actuators may include buttons, switches, dials, electronic touch screens, touch screen buttons, and so forth. Visual representations may be provided by lights, colored lights or LEDs, geometric shapes, photos, drawings, touch screen icons, and so forth.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
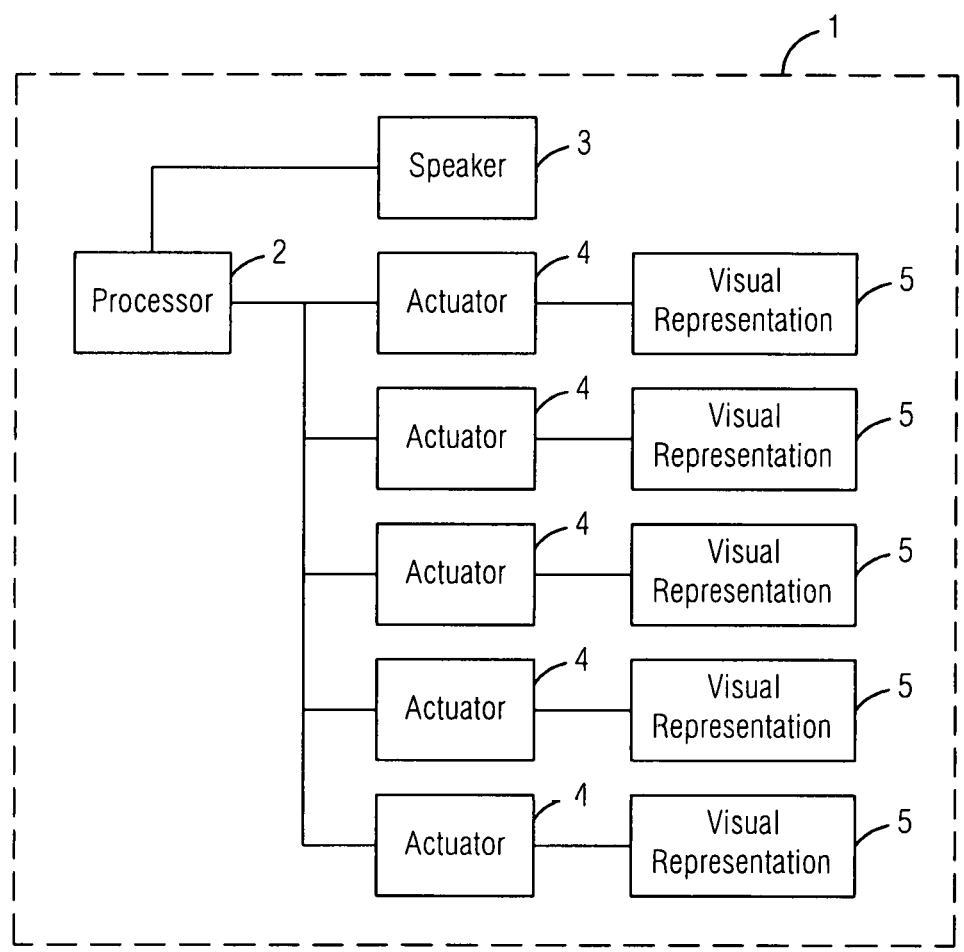
FIG. 1 is a block diagram of the activity arch and components of the present invention.

For purposes of describing the preferred embodiment, the terminology used in reference to the numbered accessories in the drawings is as follows:

1. activity arch, generally
2. processor
3. speaker
4. actuator
5. visual representation
6. button
7. colored light
8. support structure
9. base
10. mat
11. electronic touchscreen
12. icon
13. touchscreen button
14. switch
15. geometric shape With general reference to FIG. 1, a block diagram of the activity arch 1 and components of the present invention is illustrated. The activity arch 1 of the present invention provides a support structure and housing (as further illustrated in FIGS. 2-4) for supporting connectivity to a processor 2, at least one speaker 3, and a plurality of actuators 4 wherein the processor 2 is programmed to deliver audio through the at least one speaker to a child. The audio ques prompt the child to select a specific actuator 4 from the plurality of actuators 4 located on the arch. Each actuator 4 is preferably coupled with a unique visual representation 5 each visual representation 5 being taken from a set of possible answers available to the child in response to an auditory que.

Figure 2:
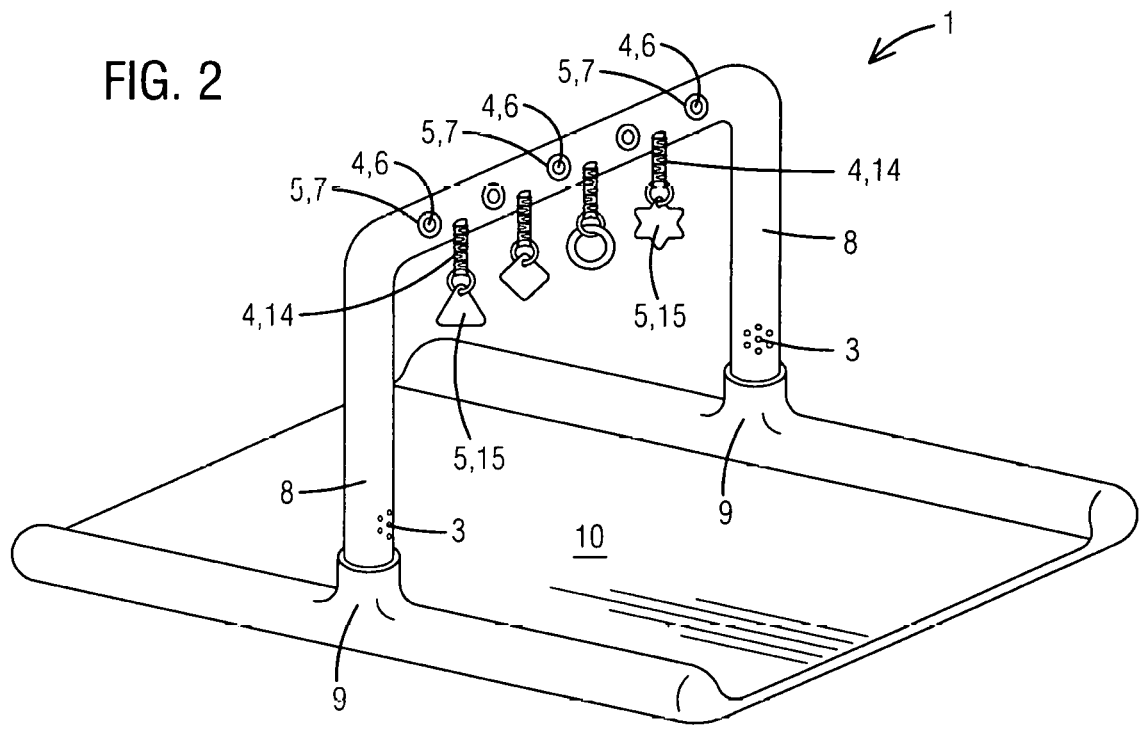
FIG. 2 is an exemplary perspective view of an activity arch of the present invention wherein the actuators and visual representations are buttons and colored lights, respectively.
Figure 3:
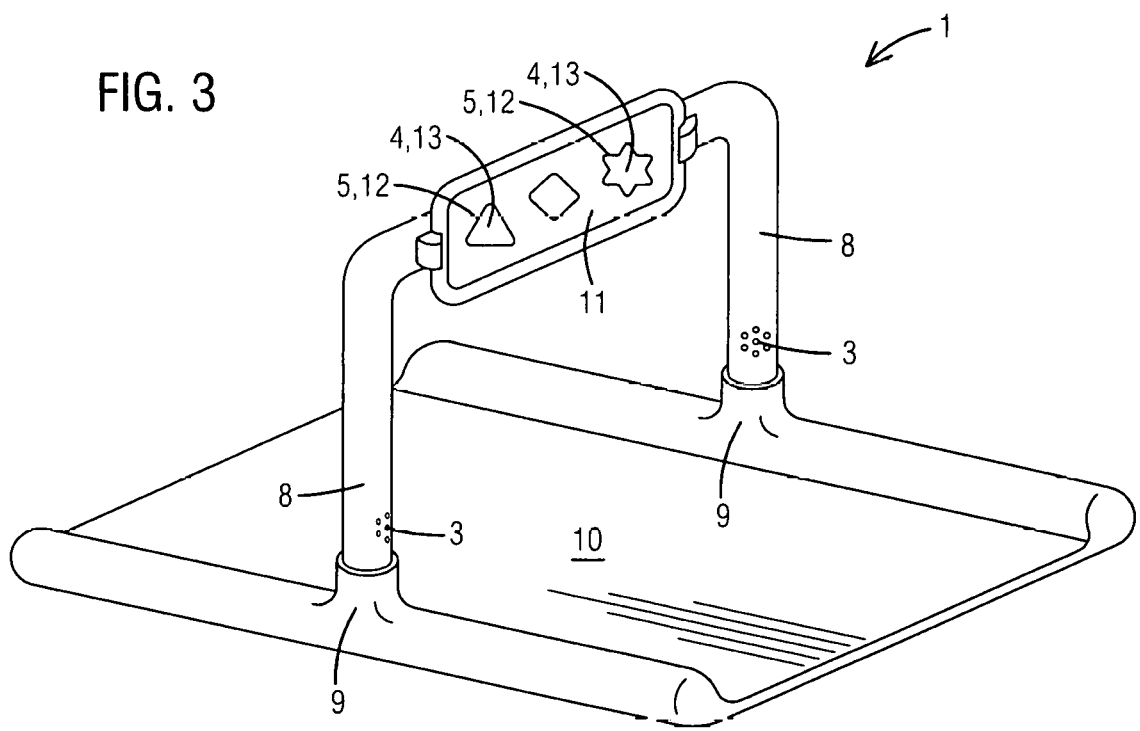
FIG. 3 is an exemplary perspective view of an activity arch of the present invention wherein the actuators and visual representations are generated and displayed on an electronic touchscreen.
Figure 4:
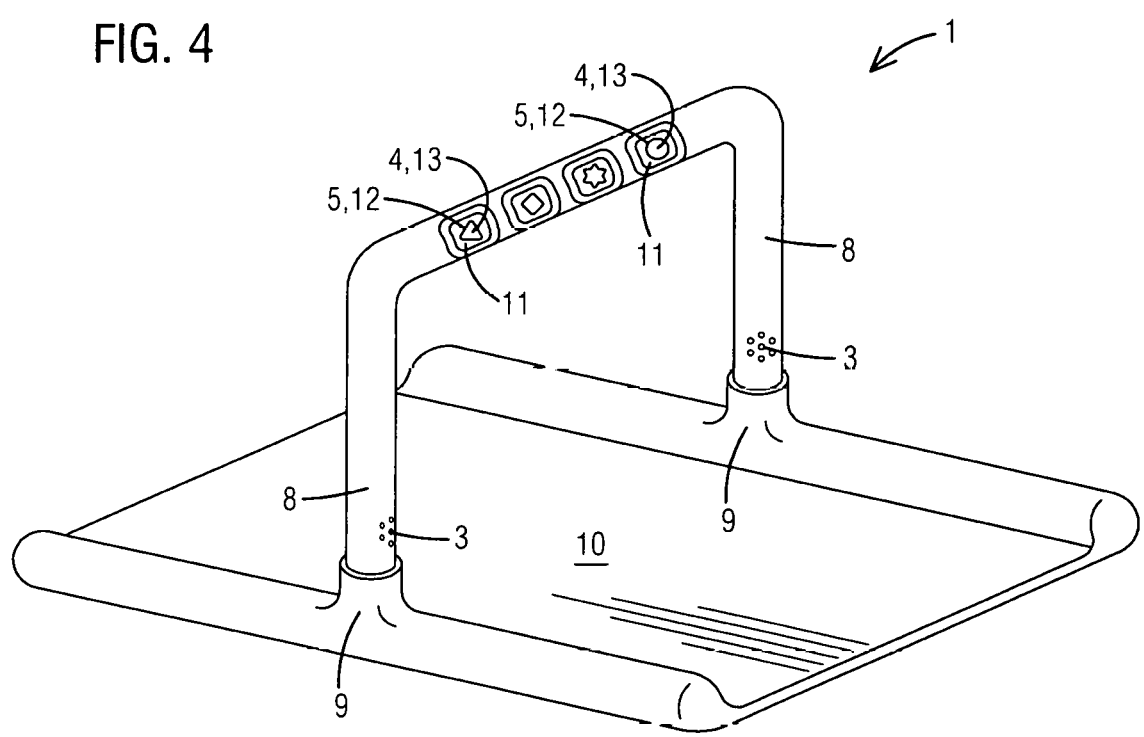
FIG. 4 is an exemplary perspective view of an activity arch of the precent invention wherein the actuators and visual representations are generated and displayed on a plurality of electronic touchscreens.

For the activity arch 1 to operate, first, a processor 2 selects an answer from a set of possible answers, wherein each possible answer is represented by a visual representation 5 and actuator 4 located on the activity arch 1, selects an answer. Then, the processor 2, sends an audible prompt through the at least one speaker 3 to a child to pick the selected answer from the available actuators 4 and visual representations 5. If the child selects a visual representation 5 of the correct answer and corresponding actuator 4, then the processor 2 will deliver an audio confirmation of a correct selection being made by the child. Alternatively, if the child selects the wrong visual representation and actuator 4, then the processor 2 will deliver an audio confirmation of an incorrect selection being made. The processor 1 may be programmed to offer additional opportunities for the child to select the correct answer; offer a plurality of audible prompts and correct answers; and/or provide sequencing and memory games to reinforce learning via manual programming and/or artificial intelligence. As illustrated in FIGS. 2-4, actuators 4 may include buttons, switches 14, dials, electronic touch screens, touch screen buttons, and so forth. Visual representations 5 may be provided by lights, colored lights or LEDs, geometric shapes 15, photos, drawings, touch screen icons, and so forth.

With reference to FIG. 2, an exemplary perspective view of an activity arch 1 of the present invention wherein the actuators 4 and visual representations 5 are buttons 6 and colored lights 7, respectively, is illustrated. The activity arch 1 comprises a U-shaped or curved support structure 8 supported by a base 9. A mat 10 is provided under the support structure 8 for a child to lay or sit on. The support structure 1 provides a mounting surface and housing for supporting at least one speaker 3 and a plurality of actuators 4, all of which are connected to the processor 2 programmed to deliver audio ques to a child through the at least one speaker 3. Each actuator 4 is preferably coupled with a unique visual representation with each visual representation 5 being taken from a set of possible answers available to the child in response to an auditory que. As illustrated herein, the visual representations 5 may be colored buttons or colored lighted buttons that also act as the actuators 4 for selecting an answer.

With reference to FIG. 3, an exemplary perspective view of an activity arch 1 of the present invention wherein the actuators 4 and visual representations 5 are generated and displayed on an electronic touchscreen 11 is illustrated. The activity arch 1 comprises a U-shaped or curved support structure 8 supported by a base 9. A mat 10 is provided under the support structure 8 for a child to lay or sit on. The support structure 1 provides a mounting surface and housing for supporting at least one speaker 3 and a plurality of actuators 4, all of which are connected to the processor 2 programmed to deliver audio ques to a child through the at least one speaker 3. Each actuator 4 is preferably coupled with a unique visual representation with each visual representation 5 being taken from a set of possible answers available to the child in response to an auditory que. As illustrated herein, the visual representations 5 is an electronic touchscreen 11, such as a tablet, that provides actuators 4 in the form of touchscreen buttons 13 and the visual representations 5 in the form of icons 12.

With reference to FIG. 4, an exemplary perspective view of an activity arch 1 of the present invention wherein the actuators 4 and visual representations 5 are generated and displayed on a plurality of electronic touchscreens. The activity arch 1 comprises a U-shaped or curved support structure 8 supported by a base 9. A mat 10 is provided under the support structure 8 for a child to lay or sit on. The support structure 1 provides a mounting surface and housing for supporting at least one speaker 3 and a plurality of actuators 4, all of which are connected to the processor 2 programmed to deliver audio ques to a child through the at least one speaker 3. Each actuator 4 is preferably coupled with a unique visual representation with each visual representation 5 being taken from a set of possible answers available to the child in response to an auditory que. As illustrated herein, the visual representations 5 and actuators 4 may each be displayed on an individual electronic touchscreen 11 in the form of touchscreen buttons 13 and icons 12.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. An interactive play arch and learning system for children comprising:
   a curved support structure supported by bases at each side;
   a processor located in the curved support structure wherein said processor is capable of storing and sending commands to create audible cues;
   at least one speaker connected to said processor for emitting the audio cues received from said processor;
   a plurality of touchscreens located on said curved support structure wherein each touchscreen is connected to said processor;
   each touchscreen being positioned facing downward on the curved support structure to be viewable from beneath said curved support structure;
   said processor being programmed to deliver an audio que through the at least one speaker; and
   one of the plurality of touchscreens displaying a visual representation that matches said auditory cue; and
   said plurality of touchscreens each being capable of displaying a plurality of unique visual representations wherein each unique visual representation may be matched with an audible cue emitted from said at least one speaker.

2. The interactive play arch and learning system for children of claim 1 further comprising:
   a mat located beneath the activity arch.

* * * * *